United States Patent [19]

Boutevin et al.

[11] Patent Number: 4,518,794
[45] Date of Patent: May 21, 1985

[54] TELOMERS WHICH CAN BE CROSS-LINKED BY LIGHT

[75] Inventors: Bernard Boutevin, Montpellier; Willy-Jean Deiss, Grenoble; Marc Maliszewicz, Montpellier; Yves Pietrasanta, Meze, all of France

[73] Assignee: Societe de Vente de l'Aluminium Pechiney, Paris, France

[21] Appl. No.: 474,672

[22] PCT Filed: Jul. 20, 1982

[86] PCT No.: PCT/FR82/00122
§ 371 Date: Mar. 7, 1983
§ 102(e) Date: Mar. 7, 1983

[87] PCT Pub. No.: WO83/00336
PCT Pub. Date: Feb. 3, 1983

[30] Foreign Application Priority Data

Jul. 22, 1981 [FR] France .............................. 81 14789

[51] Int. Cl.³ .............................................. C07C 69/533
[52] U.S. Cl. ........................................ 560/192; 260/942; 260/952; 549/473; 560/104; 560/223
[58] Field of Search .................. 560/104, 192, 223; 549/473; 260/942, 952

[56] References Cited

U.S. PATENT DOCUMENTS 3,816,512 6/1974 Starks ................................. 560/192
3,963,772 6/1976 Takeshita ......................... 560/192

*Primary Examiner*—Richard L. Raymond
*Attorney, Agent, or Firm*—Oblon, Fisher, Spivak, McClelland and Maier

[57] ABSTRACT

Telomers and cotelomers with at least one sequence which can be cross-linked by light, and a method of preparing them.

They are of the general formula

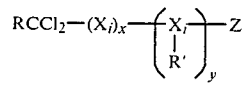

wherein the taxogen links $-(X_i)-$ belong to the group made up of 2-hydroxy ethyl acrylate and methacrylate, acrylic or methacrylic acid, vinyl alcohol and allyl alcohol; the

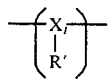

links emanate from the same taxogen $X_i$, esterified by means of a group with at least one photo-crosslinkable double bond in its molecule; and where $1 < x + y \leq 1000$, Z being chosen form the group $-H$, $-Cl$, $-Br$; and where R may be a simple or macromolecular radical, in the latter case leading to the formation of dual sequence cotelomers.

The manufacturing process comprises telomerization by redox or radical catalysis, followed by grafting on the photo-crosslinkable group, the first phase of telomerization being duplicated in the case of a cotelomer.

The main application for the products is in coating metals.

12 Claims, No Drawings

TELOMERS WHICH CAN BE CROSS-LINKED BY LIGHT

The invention relates to telomers with one or more sequences, at least one of which has unsaturated lateral groups over its length, the lateral groups being distributed statistically and having properties of cross-linking by light.

It also concerns a method of obtaining these telomers.

Telomers are synthesised organic substances resulting from a reaction known as telomerisation, in which an unsaturated organic compound $X_i$ called the "taxogen" reacts in the presence of catalysts or initiators with another compound AZ called the "telogen", leading to the condensation of $X_i$, in formation of a sequence of n divalent —$(X_i)$— links, and the division of the telogen AZ into two parts, which are hooked onto the ends of the sequence to give a product of the general formula: A—$(X_i)_n$—Z called the telomer. This may in turn act as a telogenic agent for another taxogen $Y_i$ and lead to the production of dual sequence cotelomers of the general formula:

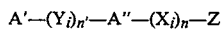

where A' and A" result from the division of A.

Applicants have taken a particular interest in these products and in derivitives thereof which result from grafting unsaturated lateral grafts onto at least one of the sequences.

Molecules of low molecular weight which have unsaturated groups are already known or on the market. For example, in the case of allyl grafts, 1,1,2,2-tetraallyloxy ethane has in fact been commercialised, and in the case of acrylic grafts acrylates of diols, triols or tetraols are known. But these compounds do not have more than four groups that can be photopolymerised.

Molecules of molecular weight from 1000 to 3000 (telechelic oligomers) with two acrylic groups at the ends of the chain are widely used in industry. These macromolecules may e.g. be obtained from dihydroxylated polyurethanes or polyesters.

Finally, polymers of high molecular weight with substituted allyl and/or acrylic groups have been known for a long time, and applications of them still form the subject of many patents and publications. Some examples are polyvinyl alcohols and glycol poly(meth)acrylates substituted by acrylic groups of the cinnamic, β-(2-furyl)acrylic or β-(pyridyl)acrylic type. Very few compounds with unsubstituted allyl or acrylic grafts have been described in the literature in connection with this type of macromolecule. French Pat. No. 2 412 572, in which the grafts are formed by carbonate bridges, should nevertheless be noted.

The originality of the invention stems from the fact that Applicants have synthesised single sequence telomers and dual sequence telomers or cotelomers with sequences of specific length and have grafted controlled numbers of special groups onto them. This has resulted in new products, with a combination of important properties which can be applied to various technical fields.

Thus Applicants have been able to make products with sequences of small length, that is to say, of relatively low molecular weight, with consequent low viscosity and a resultant ability to be used without solvent.

They have also developed single sequence telomers with links of a structure such that a certain number of highly reactive groups, such as acrylic and allyl derivitives, could be hooked onto them, thus giving them remarkable properties of cross-linking by light, while still leaving some links in the sequence ungrafted and thus enabling them to apply their own properties, for example enabling links with an acid or alcohol function to have more or less solubility in water or an ability to adhere to metals.

By extending the invention to dual sequence telomers, Applicants have been able to create or develop other properties, depending on what the second sequence consists of. Some examples of these properties are improved surface properties when fluorine radicals are present, flexibility when there are diene radicals or resistance to hydrocarbons when working with acrylic radicals such as acrylonitrile.

The telomers according to the invention are of the general formula:

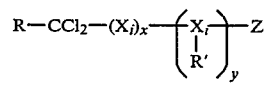

wherein the sequence of —$(X_i)$— and

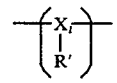

links emanates from an identical taxogen $X_i$ with a free function, belonging to the group made up of primary alcohol, acid and secondary alcohol functions, and where the

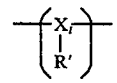

links correspond to the esterified form of $X_i$, R' being the radical of the group used for esterification, $RCCl_2$— and —Z being the parts of the telogen $RCCl_2Z$ where —Z belongs to the group made up of the —H, —Cl and —Br radicals and R belongs to the group made up of simple radicals and macromolecular radicals, characterised in that $X_i$ belongs to the group made up of subgroups $X_1$, $X_2$, $X_3$, $X_4$ in which $X_1$ is represented by 2-hydroxy ethyl acrylate and 2-hydroxy ethyl methacrylate, $X_2$ is represented by acrylic acid and methacrylic acid, $X_3$ is represented by vinyl alcohol, $X_4$ is represented by allyl alcohol, that $0 < x \leq 500$, $1 < y \leq 500$, $1 < x+y \leq 1000$, and that the group used for esterification has at least one double bond which can be cross-linked by light and belongs to the group made up of acids and acid chlorides in the case of $X_1$, $X_3$ and $X_4$ and alcohols in the case of $X_2$.

Thus the telomers claimed are charecterised in particular by the presence of a sequence where the taxogen has a free function, such as the primary alcohol function in 2-hydroxy ethyl acrylate and methacrylate and allyl alcohol, the acid function in acrylic acid methacrylic acid and the secondary alcohol function in vinyl alcohol. The number of links in the sequence is from 1 to 1000, and all or at least half of these are esterified by acid or alcohol groups which have at least one ethylene bond that can be cross-linked by light. The groups are distributed statistically along the sequence and enable the resultant telomer simultaneously to develop the properties resulting from the presence of the various nonesterified functions.

Different groups may be used for esterification, depending on the structure of the taxogen forming the links of the sequence. Thus where the taxogen is $X_1$ or $X_3$ or $X_4$ and has an alcohol function, acrylic, methacrylic, cinnamic, furyl acrylic, cinnamylidene or allyl acid should be chosen. Where the taxogen has an acid function, referred to as $X_2$, an alcohol such as 2-hydroxy ethyl acrylate or methacrylate, allyl alcohol or cinnamic alcohol should be chosen.

Z, which may be a —H, —Cl or —Br radical, is preferably limited to the —Cl radical when the taxogen is of the $X_1$ and $X_2$ type.

As far as R is concerned, it belongs to the group made up of simple and macromolecular radicals. The macromolecular radicals emanate from other telomers where $Y_1$ is the taxogen and thus lead to the formation of dual sequence cotelomers, which enjoy the advantages provided by the properties of both sequences.

The radical R may take different forms, depending on the taxogen $X_i$.

Thus with $X_1$, R may be a simple radical belonging to the group made up of —Cl, $CH_3$—O—CO— and $CF_3$—, corresponding respectively to carbon tetrachloride, methyl trichloroacetate and trifluorotrichloroethane telogens.

R may also be a macromolecular radical belonging to the group made up of:

where $1 \leq n_1 \leq 10$,

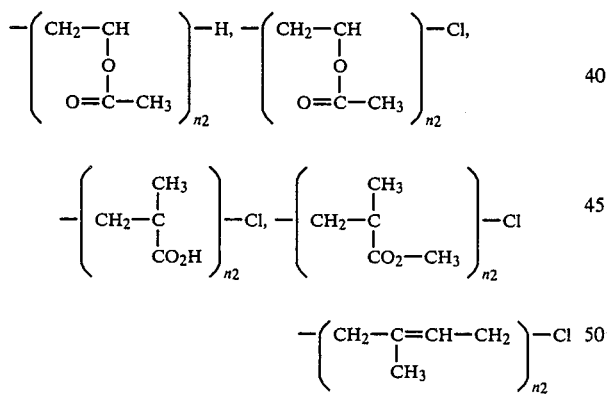

where $1 \leq n_2 \leq 500$, that is to say, the radicals emanate respectively from the following telomers: chlorotrifluoroethylene-carbon tetrachloride, vinyl acetate-chloroform, vinyl acetate-carbon tetrachloride, methacrylic acid-carbon tetrachloride, methyl methacrylate-carbon tetrachloride, isoprene-carbon tetrachloride.

With $X_2$, R may be a simple radical belonging to the group made up of —Cl and —$CF_3$, corresponding respectively to telogens of carbon tetrachloride and trifluorotrichloroethane, and also the macromolecular radical —$(CF_2-CFCl)_{n1}$—Cl where $1 \leq n_1 \leq 10$, that is to say, the radical emanating from the chlorotrifluoroethylenecarbon tetrachloride telomer.

With $X_3$, R may be the simple radical belonging to the group made up of —Cl, $(C_2H_5O)_2$—PO— or a macromolecular radical belonging to the group made up of

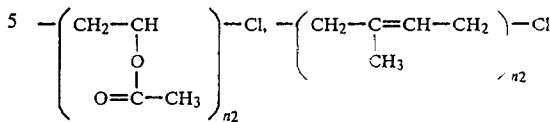

where $1 \leq n_2 \leq 500$ that is to say, the radicals emanate respectively from carbon tetrachloride, chloroform, diethyl hydrogen phosphonate and bromotrichloromethane telomers and vinyl acetate and isoprene telomers with carbon tetrachloride or chloroform telogens.

With $X_4$, R may be a simple radical belonging to the group made up of —$CCl_2$—$CO_2H$, —$CCl_2$—$CO_2CH_3$, —$CCl_3$, $(C_2H_5O)_2$—PO—, that is to say, emanating respectively from the following telogens: trichloroacetic acid, methyl trichloroacetate, chloroform and diethyl hydrogen phosphonate.

The invention also concerns a method of preparing the telomers and cotelomers described above.

There are generally to main stages:

the first is a process of telomerising the taxogen, which may be duplicated with the telomer obtained being used as the new talogenic agent to obtain dual sequence cotelomers; this is then a bistelomerisation process the second is an esterifying process, in which an unsaturated group, adapted to enable the resultant product to be cross-linked by light, is grafted onto the links of the sequence of the telomer or onto at least one of the sequences of the cotelomer.

In some cases, however, esterification may precede telomerisation.

But depending on the taxogen used in telomerisation or that present in the macromolecular radical R involved in bistelomerisation, the synthesis of each of these products will take on special features.

Thus in the case of a telomerising reaction, if the taxogen used is of the vinyl, conjugated diene or allyl type, the telogenic agent chosen will be chloroform and catalysis will then be peroxidic (benzoyl peroxide or azobisisobutyronitrile then being used to initiate telomerisation). The cleavage which takes place is the C—H cleavage, and in this case one of the telechelic ends is the trichloromethyl group: $CCl_3$.

If the taxogen is of the acrylic, conjugated diene or chlorotrifluoroethylene type, the telogenic agent is then carbon tetrachloride and catalysis is of the redox type (the $FeCl_3$/benzoin couple is the most commonly used although other transition metals and/or transition metal salts: Mg, Cu, etc. may also be employed). In these cases the cleavage of the telogenic agent is of the C—Cl type, but as in the case mentioned above there is still a trichloromethyl group at the end of the telomer.

In the case of a bistelomerising reaction where the telomers obtained above, which are of the $RCCl_3$ type, then act as telogenic agents, if the new taxogen is vinylic the reaction will take place by peroxide catalysis (see above). For all other taxogens: acrylic, conjugated diene, chlorotrifluoroethylene, catalysis is of the redox type.

Furthermore, when the taxogens are of the vinyl and allyl type, vinyl acetate and allyl acetate are used respectively as the base material for telomerisation. Hydrolysis is then carried out in the presence of sodium methanolate, leading to the appearance of the alcohol functions onto which the groups which can be cross-linked by light will subsequently be grafted.

As far as the number of x+y links included in the various sequences of the taxogens is concerned, this is indicated by the average degree of polymerisation by number $\overline{DP_n}$ and the index of polydispersity $\overline{DP_o}$ of the telomerising reaction, which are dependent on parameters already known in the literature.

MAYO has defined a general law for peroxidic telomerisation:

$$1/\overline{DP_n} = 1/\overline{DP_o} + C_T r$$

and BOUTEVIN and colleagues for telomerisation by redox catalysis:

$$1/\overline{DP_n} = C_{cat} c + C_T r$$

with c=(Cata)/(Taxo) and r=(Telo)/(Taxo), $C_T$ and $C_{cat}$ being the constant of transfer to the telogen and to the catalyst.

These laws have been applied in the invention and have made it possible for the $\overline{DP_n}$ of the various desired sequences to be determined at a previous stage. The results obtained in sealed tubes were then extrapolated onto a semi-industrial reactor for pilot operations. In the reactor it was possible for stages 1 and 2, leading to dual sequence cotelomers, to be carried out in one stage, with the second monomer being brought into the reaction when the first stage had come to an end (see example no. 4).

As far as esterification is concerned, various existing methods applied to simple molecules or polymers have been adapted to dual sequence cotelomers. The methods used depend on the groups to be grafted and the structure of the taxogens.

Thus, in the case of type $X_1$, $X_3$ and $X_4$ taxogens which thus form polyol sequences, it has been above that the groups used for esterification were either acids or acid chlorides.

When they are acrylic acid chlorides such as cinnamic acid chloride, the mode of operation used consists of activating with pyridinium complexes or the Schotten Baumann method.

On the other hand, when the groups are acrylic acid one can have recourse to direct azeotropic esterification, using sulfonic paratoluene acid or sulfuric acid as catalyst. Esterification is effected with aromatic solvent or solvent of the chlorine type: $CH_2Cl_2$ or $CHCl_3$, for example, when it has to take place at low temperature, due to the danger of thermal polymerisation.

In the case of $X_2$ type taxogens, which thus form polyacid sequences, grafting is preceded by activation of the acid functions by passing them through acid chloride, using pure thionyl chloride with a reflux. Grafting then takes place in tetrahydrofuran or any other aprotic solvent without any water, in a stream of nitrogen.

The invention will be understood better from the examples of its application which are given below without imposing any restrictions on it.

The telomerisation and/or cotelomerisation reactions were carried out in sealed tubes or a reactor under pressure, and in cases where the boiling points of the taxogens and telogens were high enough, in a pyrex reactor at atmospheric pressure. The structures described in these examples were determined by the following analytical methods: centesimal analysis, magnetic proton resonance, chromatography by permeation of gel, measuring viscosity and infra-red spectrophotometry.

EXAMPLE 1

Telomerisation of the taxogen $X_1$: 2-hydroxy ethyl acrylate with the telogen 1,1,1-trifluorotrichloroethane

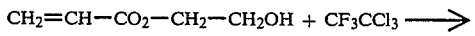

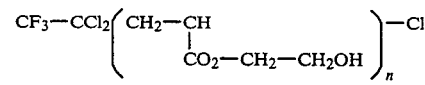

174 g of 2-hydroxy ethyl acrylate; 281.25 g of $CF_3CCl_3$; 2.43 g of ferric chloride; 3.15 g of benzoin and 200 cc of acetonitrile are placed in a reactor. It is heated with agitation for 12 hours at a temperature of 115° C. and a pressure of 4.4 bars. When the reaction is over the solvent is evaporated and 272 g of a viscous product is obtained.

In a separate process the non-reacted taxogen is removed at 20 Torr. The rate of conversion to telomer is 90%. The mono addition compound is distilled off (boiling temperature: 92° C. at $0.5 \times 10^{-2}$ Torr).

After fractionated precipitation of the reaction medium, the average degree of polymerisation of each fraction is determined by centesimal analysis. This gives the following results:

products soluble in either: $\overline{DP_n} \leq 5$ (3% by weight of total)

products soluble in chloroform: $\overline{DP_n} = 9$ (53% by weight of total)

products soluble in acetone: $\overline{DP_n} = 11$ (26% by weight of total)

products soluble in methanol: $\overline{DP_n} = 18$ (18% by weight of total).

EXAMPLE 2

Esterification of the telomer from example 1 with acrylic acid. The product with $DP_n = 9$ is used. The polyol is directly azeotropically esterified at 39.5° C. by the excess acrylic acid, in methylene chloride ($CH_2Cl_2$), with sulfonic paratoluene acid being used as catalyst. The following product is obtained after purification:

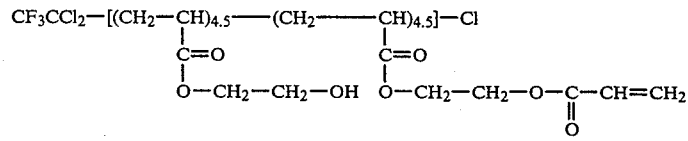

EXAMPLE 3

Esterification of the telomer from example 1 by cinnamoyl chloride

The various fractions obtained in example 1 are grafted with cinnamoyl chloride by the following method: freshly distilled pyridine is placed in a flat-bottomed flask with two tubes, fitted with a condenser, a bromine funnel and a magnetic agitating system. The cinnamoyl chloride, dissolved in carbon tetrachloride or toluene, is dripped in through the bromine funnel. When all the solution has been added and a milky precipitate appears, the telomer dissolved in pyridine is added. After half an hour's reaction at room temperature the first precipitate disappears and a second, granular precipitate appears. The pyridine evaporates and a product soluble in chloroform is obtained.

With all the fractions in example 1 approximately 75% grafting is always obtained. In the case of the fraction soluble in chloroform ($\overline{DP}_n = 9$) we obtain a product of the following formula:

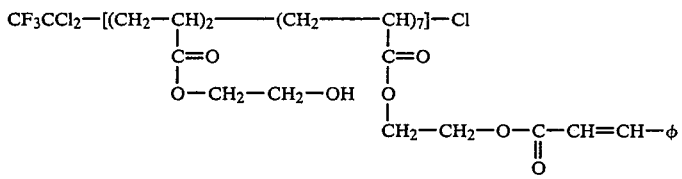

φ representing a benzene ring.

EXAMPLE 4

Bistelomerisation of 2-hydroxy ethyl acrylate with the CCl$_4$-isoprene telomer then grafting of acrylic acid.

773 g of 2-hydroxy ethyl acrylate; 103 g of carbon tetrachloride; 683 g of acetonitrile; 10.8 g of ferric chloride and 14 g of benzoin are placed in a 4.5 l pilot reactor. The reaction is carried out at 110° C. and 4.4 bars for 4 hours, after which the pressure drops (3.5 bars); 907 g of isoprene is then added directly. The reaction is continued for 6 hours. After evaporation and treatment, 1095 g of dual sequence cotelomer is obtained. Acrylic acid is then grafted as described in example 2, and the following final product is obtained:

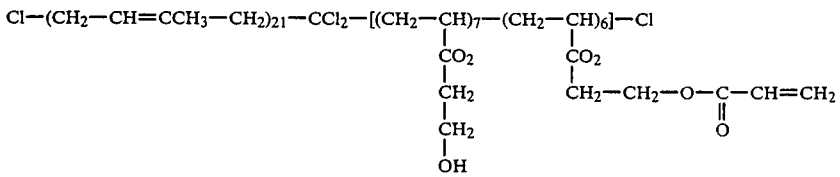

i.e. a dual sequence 2-hydroxy ethyl acrylate-isoprene cotelomer containing approximately 45% of acrylic grafts.

EXAMPLE 5

Bistelomerisation of the taxogen X$_2$: acrylic acid with the telomer of carbon tetrachloride and chlorotrifluoroethylene

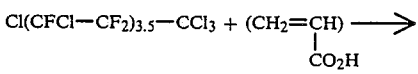

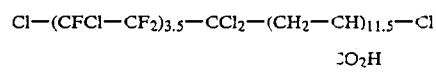

2.5 moles of acrylic acid (180 g); 0.49 mole of Cl—(CFCl—CF$_2$)$_{3.5}$—CCl$_3$ (77.5 g); 2.034×10$^{-2}$ mole of ferric chloride (3.17 g); 1.95×10$^{-2}$ mole of benzoin (4.14 g) and 200 g of butyronitrile are placed in a 1 liter pyrex reactor. The reaction takes place for 24 hours with reflux of the solvent. When the butyronitrile has evaporated, the unreacted telogen is recovered (14.5 g) aand 140 g of product is obtained. The ratio converted to telomer is 50%. Fractionated precipitation produces 100 g of solid white substances soluble in acetonitrile ($DP_n = 44$) and 40 g of solid yellow substances soluble in ether ($DP_n = 11.5$).

EXAMPLE 6

Activation of the acid functions of the cotelomer in example 5

The fraction with $\overline{DP}_n = 11.5$ obtained in example 5 is treated as follows. 27 g of the telomer is placed in a pyrex reactor fitted with a cooler. Pure thionyl chloride (SOCl$_2$) is added. The solution is heated for 114 hours with reflux and vigorously agitated (magnetic agitation). When the volatile products have evaporated, 30.3 g of the following is obtained:

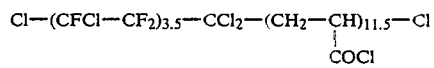

Thus all the acid functions are converted to acid chloride functions.

EXAMPLE 7

Esterification of the cotelomer from the previous example with cinnamic alcohol

One third by weight of the product obtained in example 6 (10.1 g) is dissolved in anhydrous tetrahydrofuran. The cotelomer and 19.4 g of cinnamic alcohol are placed in a flask fitted with a cooler, a bromine funnel and a system for bubbling a stream of nitrogen into the solution. The reaction is brought to a temperature of 40° C. and is followed by liberation of the hydrochloric acid produced. When all the acid has been liberated, the solvent is evaporated and a product of the following formula is obtained after purification:

$$Cl-(CFCl-CF_2)_{3.5}-CCl_2-[(CH_2-\underset{|}{CH})_{1.5}-(CH_2-\underset{|}{CH})_{10}]-Cl$$
$$\phantom{Cl-(CFCl-CF_2)_{3.5}-CCl_2-[}CO_2H \phantom{xx} C=O$$
$$\phantom{Cl-(CFCl-CF_2)_{3.5}-CCl_2-[(CH_2-CH)_{1.5}-}|$$
$$\phantom{Cl-(CFCl-CF_2)_{3.5}-CCl_2-[(CH_2-CH)_{1.5}-}O-CH_2-CH=CH-\phi$$

giving 87% grafting.

EXAMPLE 8

Esterification of the cotelomer from example 6 by allyl alcohol

Allyl alcohol (15 g) is grafted onto a second third of the product of example 6 (10.1 g) by the method described in example 7. After purification the following product is obtained:

$$Cl-(CFCl-CF_2)_{3.5}-CCl_2-[(CH_2-\underset{|}{CH})_{2.5}-(CH_2-\underset{|}{CH})_9]-Cl$$
$$\phantom{Cl-(CFCl-CF_2)_{3.5}-CCl_2-[}CO_2H \phantom{xx} C=O$$
$$\phantom{Cl-(CFCl-CF_2)_{3.5}-CCl_2-[(CH_2-CH)_{2.5}-}O-CH_2-CH=CH_2$$

giving 71% grafting.

EXAMPLE 9

Grafting of the cotelomer from example 6 with 2-hydroxy ethyl acrylate 2-hydroxy ethyl acrylate (33.5 g) is grafted onto the last third of the product of example 6 (10.1 g) following the method described in example 7, but this time at room temperature. After purification the following product is obtained:

$$Cl-(CFCl-CF_2)_{3.5}-CCl_2-[(CH_2-\underset{|}{CH})_{6.6}-(CH_2-\underset{|}{CH})_{4.9}]-Cl$$
$$\phantom{Cl-(CFCl-CF_2)_{3.5}-CCl_2-[}CO_2H \phantom{xx} C=O$$
$$\phantom{Cl-(CFCl-CF_2)_{3.5}-CCl_2-[(CH_2-CH)_{6.6}-}O$$
$$\phantom{Cl-(CFCl-CF_2)_{3.5}-CCl_2-[(CH_2-CH)_{6.6}-}CH_2-CH_2-O-C-CH=CH_2$$
$$\phantom{Cl-(CFCl-CF_2)_{3.5}-CCl_2-[(CH_2-CH)_{6.6}-CH_2-CH_2-O-}\|$$
$$\phantom{Cl-(CFCl-CF_2)_{3.5}-CCl_2-[(CH_2-CH)_{6.6}-CH_2-CH_2-O-}O$$

giving 43% grafting.

EXAMPLE 10

Bistelomerisation of the taxogen $Y_f$: isoprene with the vinyl acetate-chloroform telomer $$H-(\underset{|}{CH}-CH_2)_{30}-CCl_3 + (CH_2-CCH_3=CH-CH_2) \longrightarrow$$
$$\phantom{H-(}OCCH_3$$
$$\phantom{H-(O}\|$$
$$\phantom{H-(O}O$$

$$H-(\underset{|}{CH}-CH_2)_{30}-CCl_2-(CH_2-CCH_3=CH-CH_2)_n-Cl$$
$$\phantom{H-(}O-CCH_3$$
$$\phantom{H-(O-}\|$$
$$\phantom{H-(O-}O$$

6.75 g (2.5×10$^{-3}$ mole) of vinyl acetate-chloroform telomer ($\overline{DP_n}$=30); 6.8 g of 2-methyl 1,3-butadiene (0.1 mole); 0.13 g of ferric chloride; 0.17 g of benzoin and 30 cc of acetonitrile are placed in a sealed tube. When the reaction has continued for 12 hours at 90° C., 13.8 g of a viscous product is obtained. This represents 100% conversion to cotelomer.

EXAMPLE 11

Hydrolysis and esterification of the cotelomer from example 10

$$H-(\underset{|}{CH}-CH_2)_{30}-CCl_2-(CH_3-CCH_2=CH-CH_2)_n-Cl + 30\ Cl-\underset{\|}{C}-CH=CH-\phi$$
$$\phantom{H-(}OH \phantom{xxxxxxxxxxxxxxxxxxxxxxxxxxxxxxxxxxxxxxxx} O$$

The product obtained from example 10 is treated with sodium methanolate. Two products are obtained: a substance insoluble in methanol (70% by weight) and a second substance, soluble in methanol and chloroform (30% by weight). Cinnamoyl chloride is grafted onto these two products by the method described in example 3. 100% grafting and products of the following formulae are obtained:

70% of $$H-(\underset{|}{CH}-CH_2)_{30}-CCl_2-(CH_2-CCH_3=CH-CH_2)_{65}-Cl$$
$$\phantom{H-(}OC-CH=CH-\phi$$
$$\phantom{H-(O}\|$$
$$\phantom{H-(O}O$$

30% of $$H-(\underset{|}{CH}-CH_2)_{30}-CCl_2-(CH_2-CCH_3=CH-CH_2)_{42}-Cl$$
$$\phantom{H-(}OC-CH=CH-\phi$$
$$\phantom{H-(O}\|$$
$$\phantom{H-(O}O$$

EXAMPLE 12

Bistelomerisation of acrylic acid-carbon tetrachloride telomer with isoprene $$Cl-(\underset{|}{CH}-CH_2)_{40}-CCl_3 + (CH_2-CCH_3=CH-CH_2)$$
$$\phantom{Cl-(}CO_2H$$

12.2 g of

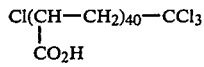

(4×10⁻³ mole) synthesised as in example 5 but using carbon tetrachloride as the telogenic agent and acetonitrile as the solvent; 10.88 g of isoprene (0.16 mole); 0.195 g of ferric chloride (1.25×10⁻³ mole); 0.262 g of benzoin (1.25×10⁻³ mole) and 100 cc of acetonitrile are placed in a glass tube. 18.2 g of product is obtained, representing 55% conversion to telomer. 6 g of the product is soluble in ether and 12 g insoluble. There are thus products of the following formulae:

6 g of

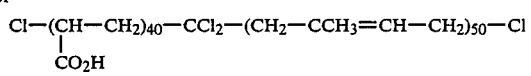

12 g of

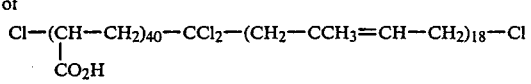

EXAMPLE 13

Esterification followed by telomerisation

Cinnamoyl chloride is grafted onto 2-hydroxy ethyl acrylate as described in example 3. The following monomer is obtained:

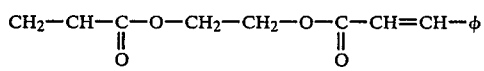

with a 90% yield. The product (24.2 g) is then reacted in a pyrex reactor with 15.4 g of carbon tetrachloride; 1.62 g of ferric chloride; 2.12 g of benzoin and 50 cc of acetonitrile. The reaction takes 24 hours with the acetonitrile at reflux. 27 g of product of the following formula is obtained:

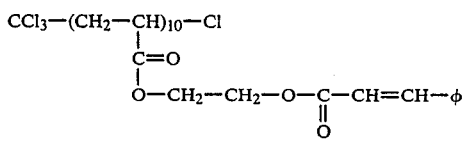

EXAMPLE 14

Telomerisation of allyl acetate 2 molar % of benzoyl peroxide, one mole of allyl acetate and r moles of telogen dissolved in 300 ml of benzene are placed in a 1 liter reactor. When the monomer has been removed (evaporation and washing with petroleum ether) a viscous product is obtained (yield 80%). The $\overline{DP_n}$ of the product, as a function of r and the telogens used, are given in the following table:

| r | $\overline{DP_n}$ | | |
|---|---|---|---|
| | HPO(OEt)₂ | HCl₂C—CO₂CH₃ | CCl₃—CO₂CH₃ |
| 1 | 2.4 | 3.45 | — |
| 0.5 | 4.5 | 5.9 | 2.6 |
| 0.25 | 8.5 | 12.5 | 5 |

-continued

| r | $\overline{DP_n}$ | | |
|---|---|---|---|
| | HPO(OEt)₂ | HCl₂C—CO₂CH₃ | CCl₃—CO₂CH₃ |
| 0.2 | 10 | 13.5 | 5.3 |

EXAMPLE 15

Esterification of the telomers of allyl acetate

The products obtained in example 14 are treated in the same way as in example 11. The corresponding telomers which can be cross-linked by light are obtained with 100% grafting.

Owing to their properties of water solubility, encrophilia, flexibility, adhesion to metals and resistance to oils, the cross-linkable telomers and cotelomers according to the invention have applications both in printing (manufacture of offset plates, photogravure and flexographic printing) and in the production of certain computer or microprocessor components (printed circuits) and as coating agents for certain metallurgical products.

We claim:

1. Telomers of the general formula

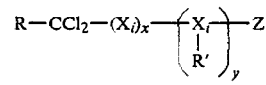

wherein the sequence of

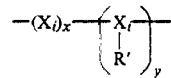

links emanates from an identical taxogen $X_i$ with a free function, selected from the group consisting of primary alcohol, acid and secondary alcohol functions, and where the

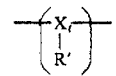

links correspond to the esterified form of $X_i$, R' being the radical of the group used for esterification, RCCl₂— and —Z being the parts of the telogen RCCl₂Z where —X is selected from the group consisting of —H, —Cl and —Br radicals, wherein $X_i$ belongs to the group made up of sub-groups $X_1$, $X_2$, $X_3$, $X_4$ in which $X_1$ is selected from the group consisting of 2-hydroxy ethyl acrylate and 2-hydroxy ethyl methacrylate, $X_2$ is selected from the group consisting of acrylic acid and methacrylic acid, $X_3$ is vinyl alcohol, $X_4$ is allyl alcohol, $0 < x \leq 500$, $1 < y \leq 500$, $1 < x+y \leq 1000$, wherein the group used for esterification has at least one double bond which can be cross-linked by light and is selected from the group consisting of acids and acid chlorides in the case of $X_1$, $X_3$ and $X_4$ and is an alcohol in the case of $X_2$ and wherein $X_i$ is $X_1$, R is selected from the group consisting of Cl, CH₃OCO, CF₃, —(CF₂—CFCl)$_{n_1}$—Cl where $1 \leq n_1 \leq 10$,

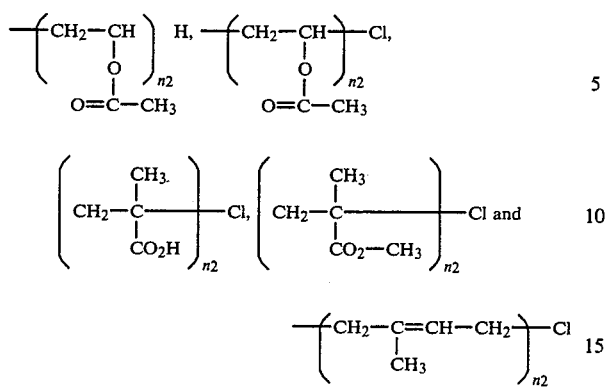

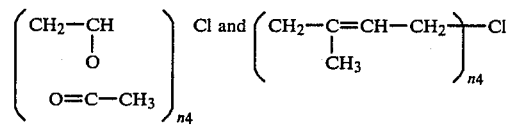

where $1 \leq n_2 \leq 500$; when $X_i$ is $X_2$, R is selected from the group consisting of Cl, $CF_3$ and $(CF_2-CFCl)_{n_3}Cl$ where $1 \leq n_3 \leq 10$; when $X_i$ is $X_3$, R is selected from the group consisting of Cl, $(C_2H_5O)_2-PO$—,

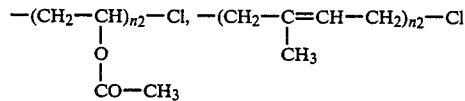

where $1 \leq n_4 < 500$; and when $X_i$ is $X_4$, R is selected from the group consisting of $CCl_2-CO_2H$, $CCl_2-CO_2CH_3$, $CCl_3$ and $(C_2H_5O)_2PO$.

2. The telomers of claim 1, wherein the group used to esterify $X_1$, $X_3$ and $X_4$ is selected from the group consisting of the following acids: acrylic, methacrylic, cinnamic, furyl acrylic, cinnamylidene and allyl.

3. The telomers of claim 1, wherein the group used to esterify $X_2$ is selected from the group consisting of 2-hydroxy ethyl acrylate and methacrylate, allyl alcohol and cinnamic alcohol.

4. The telomers of claim 1, wherein when the taxogen is of the type $X_1$ and $X_2$, the radical —Z is —Cl.

5. The telomers of claim 1, wherein when the taxogen is of the type $X_1$, R is a simple radical selected from the group consisting of —Cl, $CH_3$—O—CO— and $CF_3$—.

6. The telomers of claim 1, wherein when the taxogen is of the $X_1$ type, R is a macromolecular radical selected from the group consisting of: $-(CF_2-CFCl)_{n_1}-Cl$ where $1 \leq n \leq 10$,

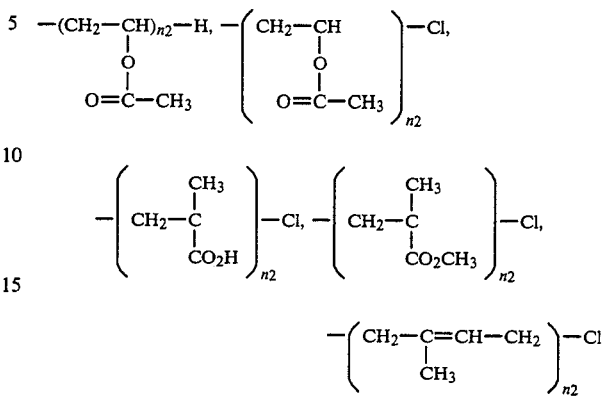

where $1 \leq n_2 \leq 500$.

7. The telomers of claim 1, wherein when the taxogen is of the type $X_2$, R is a simple radical selected from the group consisting of —Cl and —$CF_3$.

8. The telomers of claim 1, wherein when the taxogen is the type $X_2$, R is the macromolecular radical $-(CF_2-CFCl)_{n_1}$ where $1 \leq n_1 \leq 10$.

9. The telomers of claim 1, wherein when the taxogen is of the type $X_3$, R is a simple radical selected from the group consisting of —Cl and $(C_2H_5O)_2$—PO—.

10. The telomers of claim 1, wherein when the taxogen is of the $X_3$ type, R is a macromolecular radical selected from the group consisting of $$-(CH_2-CH)_{n_2}-Cl, -(CH_2-C=CH-CH_2)_{n_2}-Cl$$
$$\phantom{-(CH_2-}O\phantom{H)_{n_2}-Cl,} \phantom{-(CH_2-}CH_3$$
$$\phantom{-(CH_2-}CO-CH_3$$

where $1 \leq n_2 \leq 500$.

11. The telomers of claim 1, wherein when the taxogen is of the type $X_4$, R is a simple radical selected from the group consisting of —$CCl_2$—$CO_2H$, —$CCl_2$—$CO_2CH_3$, —$CCl_3$ and $(C_2H_5O)_2$—PO—.

12. The telomer of claim 1, defined by the following formula:

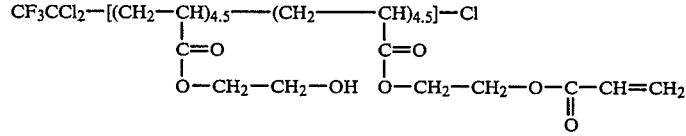

* * * * *